(12) United States Patent
Daboussi et al.

(10) Patent No.: US 11,880,723 B1
(45) Date of Patent: Jan. 23, 2024

(54) DETECTION AND CORRECTION OF DIFFERENCES IN APPLICATION PROGRAMMING INTERFACE SERVICE RESPONSES

(71) Applicant: Amazon Technologies, Inc., Seattle, WA (US)

(72) Inventors: Anas Daboussi, Watertown, MA (US); Keerthi Bala, Lincoln, MA (US); Pari Jean Fariborz Garay, Belmont, MA (US); Akshay Ganesh Nadkarni, Westford, MA (US); Hyong Hark Lee, Roxbury, MA (US); Jiazhen Zhou, Boston, MA (US); Daivat Bhatt, Cambridge, MA (US); Neil Patel, Rocky Hill, CT (US); Stephen Austin Miller, Cambridge, MA (US); Migdoel Alvarado, Braintree, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/709,873

(22) Filed: Mar. 31, 2022

(51) Int. Cl.
*G06F 9/54* (2006.01)
*G06F 11/36* (2006.01)

(52) U.S. Cl.
CPC .......... *G06F 9/542* (2013.01); *G06F 11/3664* (2013.01)

(58) Field of Classification Search
CPC ....................................................... G06F 9/541
See application file for complete search history.

(56) References Cited

U.S. PATENT DOCUMENTS

| 7,437,664 | B2* | 10/2008 | Borson | G06F 40/194 |
| | | | | 715/209 |
| 10,437,712 | B1* | 10/2019 | Tyler | G06F 11/3684 |
| 11,379,348 | B2* | 7/2022 | Sathianarayanan | G06F 9/54 |
| 11,556,403 | B1* | 1/2023 | Ponnapalli | G06F 9/547 |
| 2022/0382665 | A1* | 12/2022 | Sokhin | G06F 11/3684 |
| 2023/0004651 | A1* | 1/2023 | Bosch | H04L 63/1433 |

* cited by examiner

*Primary Examiner* — Andy Ho
(74) *Attorney, Agent, or Firm* — BakerHostetler

(57) ABSTRACT

A test application programming interface (API) request may be issued to a test service implementation. A test API response, which is responsive to the test API request, may be received from the test service implementation. First contents of the test API response may be compared to second contents of a control API response. The comparing may be performed based at least in part on a set of one or more expected differences associated with the test API response and the control API response. It may be determined, based on the comparing, whether an unexpected difference exists between the test API response and the control API response. An indication may be provided of whether the unexpected difference exists between the test API response and the control API response, and the unexpected difference may be automatically corrected, such as via one or more configuration changes.

20 Claims, 8 Drawing Sheets

DETECTION AND CORRECTION OF DIFFERENCES IN APPLICATION PROGRAMMING INTERFACE SERVICE RESPONSES

BACKGROUND

Application programming interface (API) requests and responses are a common technique for interacting with computing services. There are a number of scenarios in which different implementations may exist for a given computing service. One example of this may occur when a given service is implemented across multiple computing infrastructures, including region-based computing infrastructures and edge-based computing infrastructures. The underlying implementation of a given service on an edge-based computing infrastructure differs from the underlying implementation of the same service on a region-based computing infrastructure. However, even though the underlying implementations are different, customers may view these different implementations as the same service. For example, it may be advantageous for existing workloads targeting the region-based infrastructure to be migrated to a region-based infrastructure with little, or no, change. Thus, it be may desirable for the API service implementations of the region-based infrastructure and the edge-based infrastructure to have parity, such as to operate in the same, or a similar, manner.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
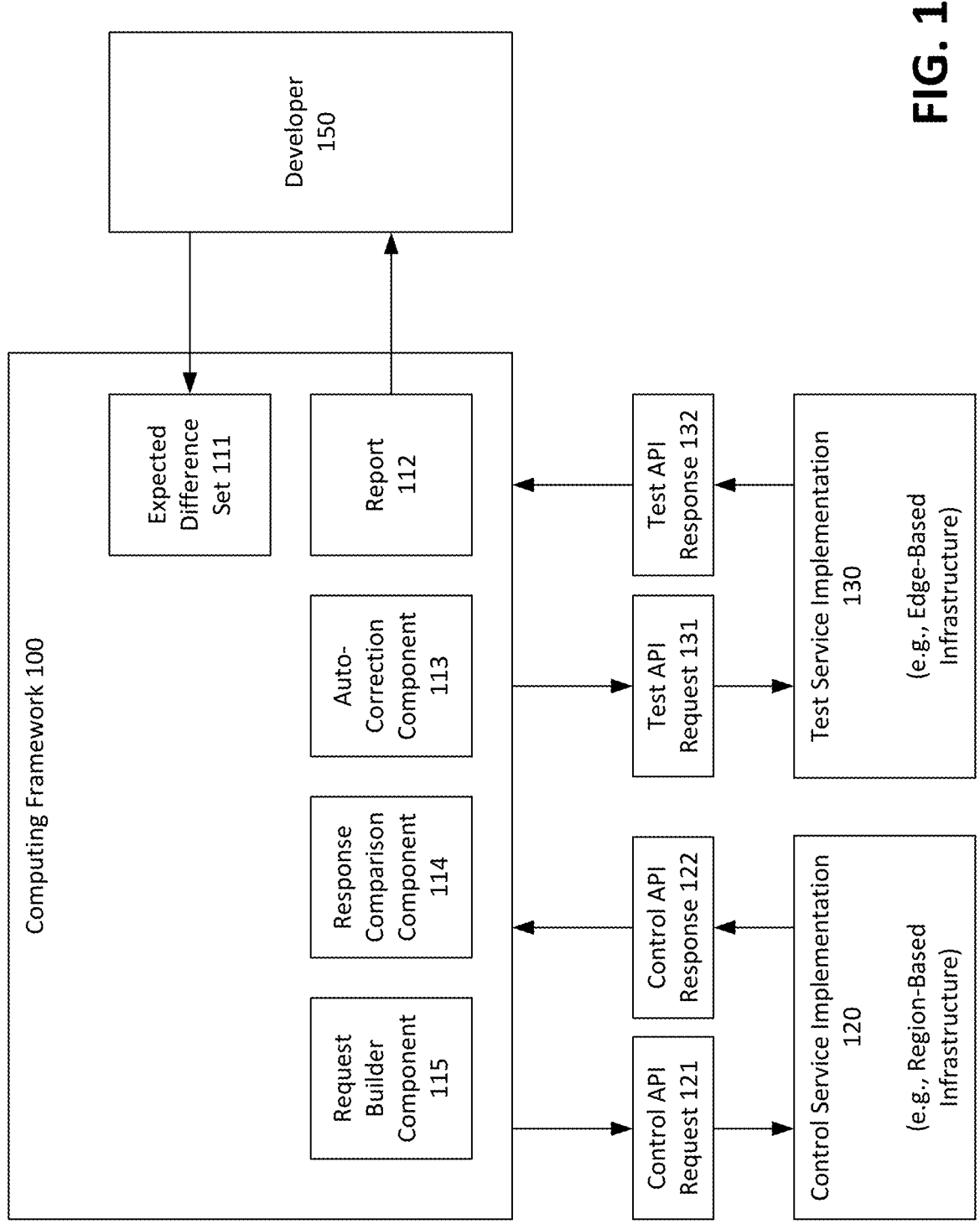
FIG. 1 is a diagram illustrating example API response sameness testing that may be used in accordance with the present disclosure.

Techniques for detection and correction of differences in application programming interface (API) service responses are described herein. In some examples, a computing framework may be provided that offers sameness testing and correctness testing. For sameness testing, the same, or similar, API requests may be issued to both a test service implementation and a control service implementation, and the responses from the two implementations may then be compared to one another. In some examples, the test service implementation may be a first implementation of a service, and the control service implementation may be a second implementation of the same service. For example, in some cases, the test service implementation may be an implementation of a service on an edge-based computing infrastructure, and the control service implementation may be an implementation of the service on a region-based computing infrastructure.

In some examples, the computing framework may build a test API request and a control API request. The test API request and the control API request may correspond to one another, meaning that they may request performance of the same underlying operation, albeit on different implementations. In order to build identical, or near identical, requests to the different implementations, the computing framework may employ and access a request protocol library, such as a hypertext transfer protocol (HTTP) library, that allows the computing framework to directly manipulate different elements of the requests, for example including the HTTP method (or other protocol method), the path, the headers, and the body.

The computing framework may also receive a set of expected differences between test service implementation responses and control service implementation responses. For example, the set of expected differences may be received from a developer, such as a developer associated with an edge-based computing infrastructure or other test service implementation. The set of expected differences may indicate known differences between test service implementation responses and control service implementation responses that are expected by the developer and that are not indicative of configuration errors or other problems.

The computing framework may issue the test API request to the test service implementation and may issue the corresponding control API request to the control service implementation. The computing framework may receive, from the test service implementation, a test API response that is responsive to the test API request. The computing framework may also receive, from the control service implementation, a control API response that is responsive to the control API request. The computing framework may then compare the test API response to the control API response. The computing framework may unpack the test API response and the control API response, for example again using a protocol (e.g., HTTP) library that allows the computing framework to directly access different elements of the responses. The computing framework may then compare the different elements of the test API response (e.g., status code, header, response body, etc.) to respective elements of the control API response (e.g., status code, header, response body, etc.).

The computing framework may then identify differences between the test API response and the control API response. Some example differences may include a header presence mismatch (e.g., a header that exists in one response but not the other), a header value mismatch (e.g., that values of respective headers differ between the two responses), a status code mismatch (e.g., that the status codes differ between the two responses), a body type mismatch (e.g., one response body is empty, while the other is in a language such as extensible markup language (XML)), an XML node or other body node mismatch (e.g., an XML node or other body node exists in one response but not the other), and an object body mismatch (e.g., a mismatch in the actual data that is retrieved by the responses). In some examples, with the exception of an object body mismatch, the computing framework may support defining of expected differences for each of the above, or other, types of differences. In some cases, expected differences may not be supported for object body mismatches because it may be expected that the actual data retrieved by the API requests should be identical regardless of the implementations upon which the requests are executed.

In some examples, for each detected difference between the test response and the control response, the computing framework may consult the set of expected differences to determine whether the detected difference is an expected difference (meaning that the detected difference is included in the set of expected differences) or an unexpected difference (meaning that the detected difference is not included in the set of expected differences). The computing framework may then provide a report to the user regarding the response comparison. In some examples, the report may indicate whether at least one unexpected difference was detected between the API responses. For example, in some cases, the report may include a pass/fail result. Specifically, a pass designation may indicate that no unexpected differences were detected between the API responses, while a failure designation may indicate that at least one expected difference was detected between the API responses. Additionally, for scenarios in which at least one unexpected difference is detected between the API responses, the report may identify each of the unexpected differences.

In addition to the sameness testing described above, the computing framework may also provide correctness testing. For correctness testing, the computing framework may issue and submit a test API request and receive a test API response. However, for correctness testing, the computing framework may compare the test API response to a control API response that is a known correct (e.g., pre-canned) response. The known correct response may be defined in code. Thus, the correctness testing may remove the need to create and issue an API request to a control service implementation, such as in scenarios when it may be difficult to access a control service implementation. The correctness testing may evaluate differences between the test response and the control response in the same manner as the sameness testing described above.

In addition to detecting unexpected differences between the API responses, the computing framework may also optionally automatically correct unexpected differences, such as by requesting configuration changes to the test service implementation that cause the unexpected differences to be resolved. Specifically, in some examples, the computing framework may correct differences, such as mismatches in status codes and error messages. API service developers can use this tool early on in the development process to quickly detect and correct any differences with the control service implementation. In some examples, the computing framework may trigger an update request to the configuration of the test service implementation and submit it for developer approval.

FIG. 1 is a diagram illustrating example API response sameness testing that may be used in accordance with the present disclosure. For sameness testing, computing framework 100 may issue a control API request 121 to a control service implementation 120 and may issue a test API request 131 to a test service implementation 130. The control service implementation 120 and the test service implementation 130 may be implementations of computing services. In some examples, the test service implementation 130 may be a first implementation of a service, and the control service implementation 120 may be a second implementation of the same service. For example, in some cases, the test service implementation 130 may be an implementation of a service on an edge-based computing infrastructure, and the control service implementation 120 may be an implementation of the service on a region-based computing infrastructure. A region-based infrastructure, as that term is used herein, refers to a computing infrastructure that is a geography-based physical cluster of computing resources of a computing services provider. An edge-based infrastructure, as that term is used herein, refers to an implementation in which computing services and computing infrastructure of a computing services provider are delivered to a customer-related premises and/or edge location. In some examples, the test service implementation 130 may include other types of computing infrastructures, such as local zones, single availability zones, and the like. In some examples, the computing framework 100 may be extensible to compare any two different implementations of the same service and may be reusable in a wide variety of computing infrastructures.

As shown in FIG. 1, the computing framework 100 may include a request builder component 115 that may build the test API request 131 and the control API request 121. The test API request 131 and the control API request 121 may correspond to one another, meaning that they may request performance of the same underlying operation, albeit on different implementations. In order to build an identical, or near identical, test API request 131 and control API request 121, the request builder component 115 may employ and access a protocol library, such as an HTTP library, that allows the computing framework to directly manipulate different elements of the test API request 131 and the control API request 121, for example including the HTTP method (or other protocol method), the path, the headers, and the body.

The computing framework 100 may receive expected difference set 111, which indicates expected differences between API responses from the test service implementation 130 and the control service implementation 120. For example, the expected difference set 111 may be received from developer 150. The developer 150 may be associated with an edge-based computing infrastructure or other test service implementation 130. The expected difference set 111 may indicate known differences between API responses from the test service implementation 130 and the control service implementation 120 that are expected by the developer 150 and that are not indicative of configuration errors or other problems.

As shown, the computing framework 100 may issue the test API request 131 to the test service implementation 130 and may issue the control API request 121 to the control service implementation 120. The computing framework 100 receives, from the test service implementation 130, a test API response 132 that is responsive to the test API request 131. The computing framework 100 also receives, from the control service implementation 120, a control API response 122 that is responsive to the control API request 121. The computing framework 100 includes response comparison component 114, which may then compare the test API response 132 to the control API response 122. The response comparison component 114 may unpack the test API response 132 and the control API response 122, for example again using a protocol library (e.g., an HTTP library), which allows the response comparison component 114 to directly access different elements of the test API response 132 and the control API response 122.

The response comparison component 114 may then compare the different elements of the test API response 132 (e.g., status code, header, response body, etc.) to respective elements of the control API response 122 (e.g., status code, header, response body, etc.). The response comparison component 114 may then identify differences between the test API response 132 and the control API response 122. Some example differences may include a header presence mismatch (e.g., a header that exists in one response but not the other), a header value mismatch (e.g., that values of respective headers differ between the two responses), a status code mismatch (e.g., that the status codes differ between the two responses), a body type mismatch (e.g., one response body is empty, while the other is in a language such as extensible markup language (XML)), an XML node or other body node mismatch (e.g., an XML node or other body node exists in one response but not the other), and an object body mismatch (e.g., a mismatch in the actual data that is retrieved by the responses). As a specific example, if the control API response 122 included a content length header, but the test API response 132 didn't include a content length header, then this may be an example of a header presence mismatch. As another example, if the control API response 122 included a content length header with a value of five, but the test API response 132 included a content length header with a value of four, then this may be an example of a header value mismatch. In some examples, with the exception of an object body mismatch, the computing framework 100 may support defining of expected differences for each of the above, or other, types of differences. In some cases, expected differences may not be supported for object body mismatches because it may be expected that the actual data retrieved by the API requests should be identical regardless of the implementations upon which the requests are executed.

In some examples, the bodies of the control API response 122 and the test API response 132 may include XML nodes. In these scenarios, one or more XML libraries, such as including an XML parsing library, may be employed to assist in comparing the body of the control API response 122 to the body of the test API response 132. For example, the response comparison component 114 may employ the one or more XML libraries to assist in building a control XML node tree that corresponds to the control API response 122 and to assist in building a test XML node tree that corresponds to the test API response 132. The response comparison component 114 may also employ the one or more XML libraries to assist in traversing the control XML node tree and the test XML node tree. For example, the one or more XML libraries may assist in performing node-by-node comparisons between the control XML node tree and the test XML node tree, such as in which each node of the control XML node tree is compared to a respective node of the test XML node tree. In some examples, the one or more XML libraries may define hooks that allow logic of the computing framework to be hooked into the one or more XML libraries, such as for determination of whether a detected difference is an expected difference or an unexpected difference. For example, as an XML library is traversing the control XML node tree and the test XML node tree, the XML library may detect a difference between two respective nodes of those trees. The XML library may then report the detected difference to the computing framework 100. The computing framework 100 may then determine the type of difference that has been detected and evaluate this detected difference against the expected difference set 111. If the detected difference matches (e.g., is the same type of difference as) one of the expected differences in the expected difference set 111, then the computing framework 100 may conclude the detected difference is expected and may essentially ignore (e.g., take no further action) on the detected difference. By contrast, if the detected difference does not match (e.g., is not the same type of difference as) any of the expected differences in the expected difference set 111, then the computing framework 100 may conclude the detected difference is unexpected and report this unexpected difference to the developer 150. The XML library may then proceed to compare and evaluate the next respective pair of nodes, if any, from the control XML node tree and the test XML node tree until both trees have been fully traversed.

In some examples, for each detected difference between the test API response 132 and the control API response 122, the response comparison component 114 may consult the expected difference set 111 to determine whether the detected difference is an expected difference (meaning that the detected difference is included in the expected difference set 111) or an unexpected difference (meaning that the detected difference is not included in the expected difference set 111). The computing framework 100 may then provide a report 112 to the developer 150 regarding the response comparison. In some examples, the report 112 may indicate whether at least one unexpected difference was detected between the test API response 132 and the control API response 122. For example, in some cases, the report 112 may include a pass/fail result. Specifically, a pass designation may indicate that no unexpected differences were detected between the test API response 132 and the control API response 122, while a failure designation may indicate that at least one expected difference was detected between the test API response 132 and the control API response 122. Additionally, for scenarios in which at least one unexpected difference is detected between the test API response 132 and the control API response 122, the report 112 may identify each of the unexpected differences.

As also shown in FIG. 1, the computing framework 100 includes auto-correction component 113, which may optionally automatically correct unexpected differences between the test API response 132 and the control API response 122, such as by requesting configuration changes to the test service implementation 130 that cause the unexpected differences to be resolved. Specifically, in some examples, the auto-correction component 113 may correct differences, such as mismatches in status codes and error messages. The developer 150 can use this tool early on in the development process to quickly detect and correct any differences with the control service implementation 120. In some examples, auto-correction component 113 may trigger an update request to the configuration of the test service implementation 130 and submit it for developer approval. In some examples, in order to assist in enabling automatic updates, developer 150 may provide update information to the computing framework 100. This update information may include, for example, indications of a service endpoint to which to issue configuration updates, indications of formats for building a change request, and indications of interpretations of configuration data that exists within the test service implementation 130.

Figure 2:
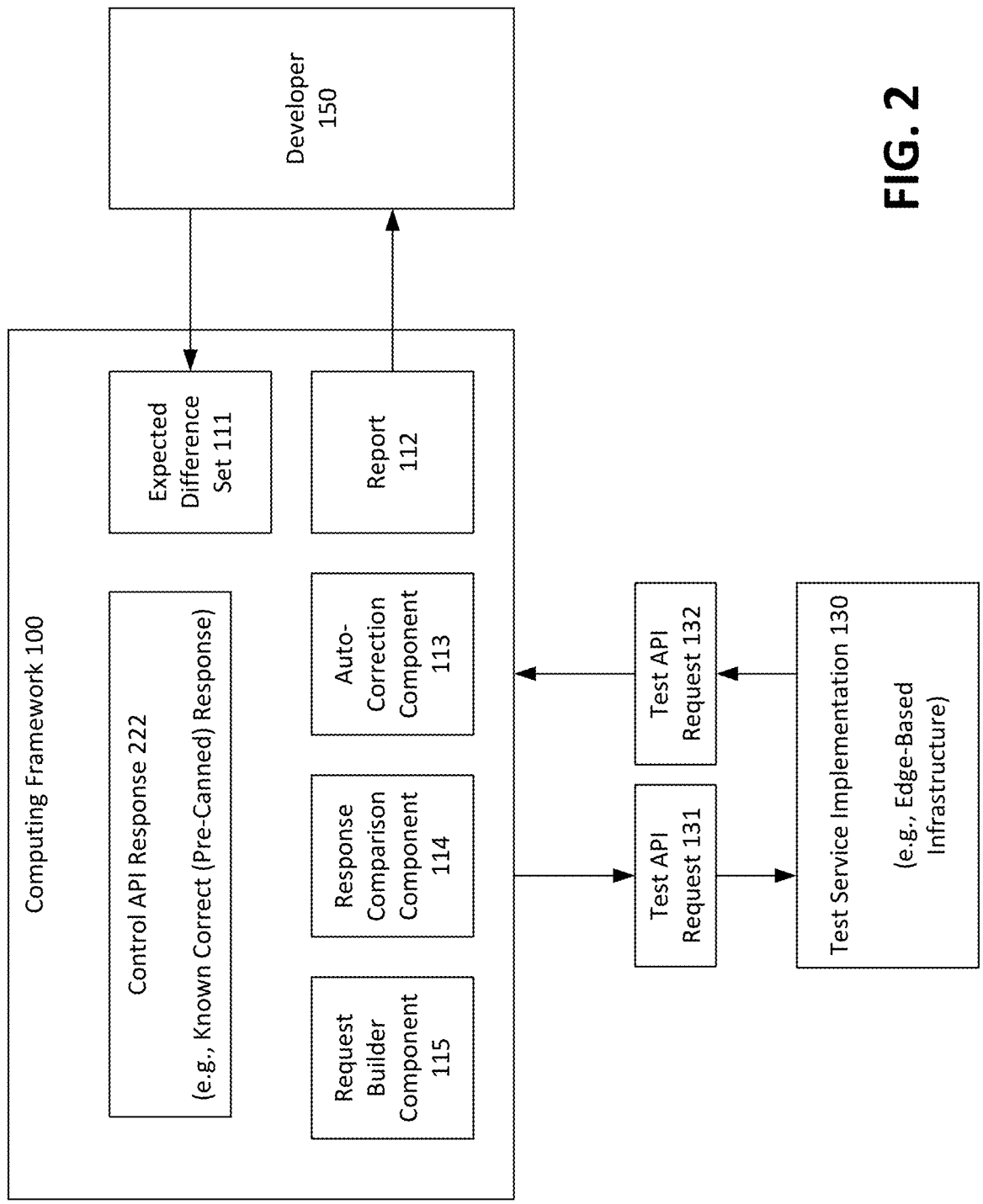
FIG. 2 is a diagram illustrating example API response correctness testing that may be used in accordance with the present disclosure.

Referring now to FIG. 2, correctness testing will now be described. In addition to the sameness testing described above with reference to FIG. 1, the computing framework 100 may also provide correctness testing. For correctness testing, the computing framework 100 may issue and submit a test API request 131 and receive a test API response 132. This is similar to the sameness testing described above with reference to FIG. 1. However, for correctness testing, the computing framework may compare the test API response 132 to a control API response 222 that is a known correct (e.g., pre-canned) response. The control API response 222 may be defined in code. Thus, the correctness testing may remove the need to create and issue a control API request 121 to a control service implementation 120, such as in scenarios when it may be difficult to access the control service implementation 120. The correctness testing may perform response comparisons and may detect and evaluate differences between the test API response 132 and the control API response 222 in the same manner as the sameness testing described above.

Figure 3:
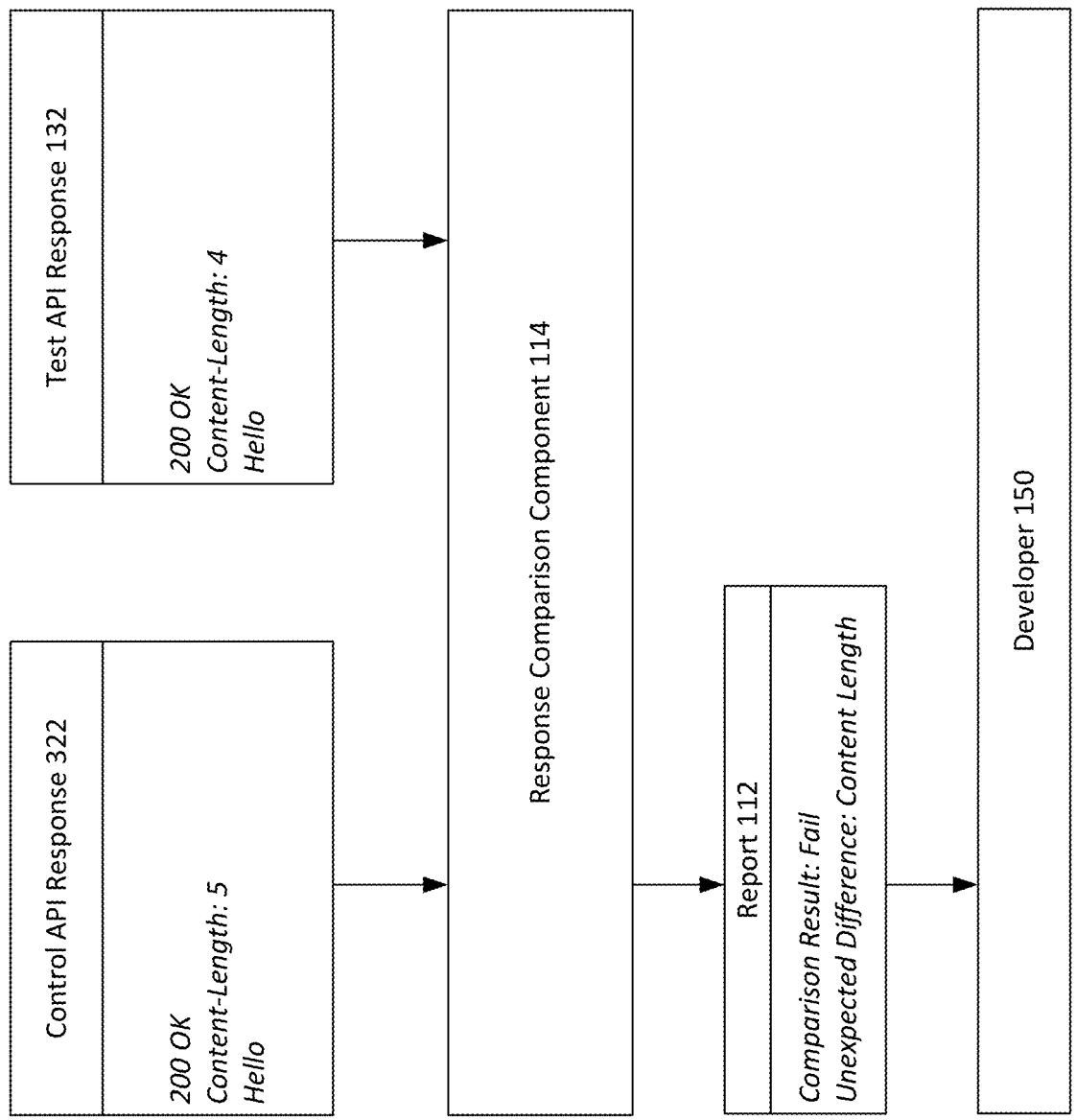
FIG. 3 is a diagram illustrating an example API response comparison with unexpected differences that may be used in accordance with the present disclosure.
Figure 4:
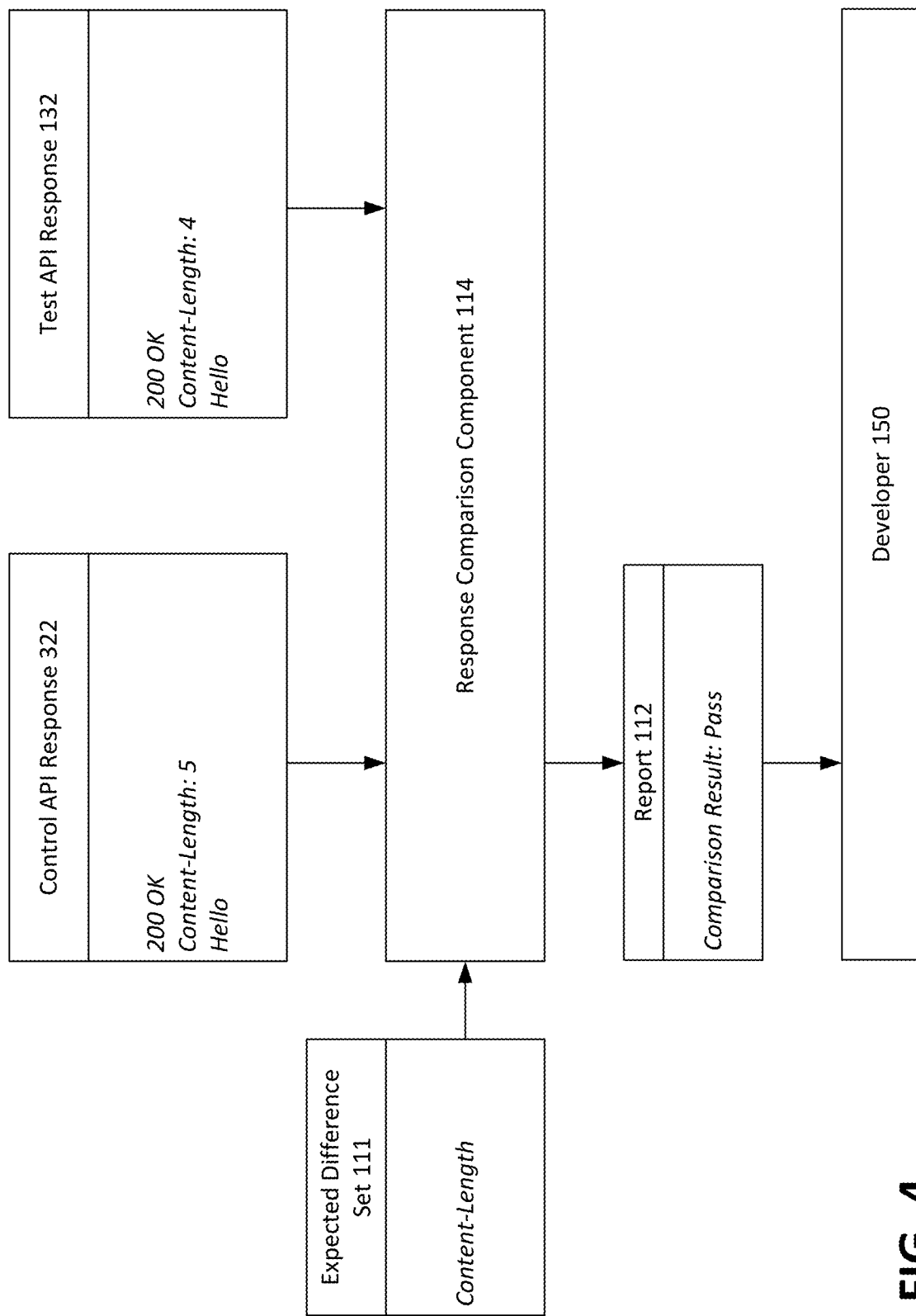
FIG. 4 is a diagram illustrating an example an example API response comparison with expected differences that may be used in accordance with the present disclosure.
Figure 5:
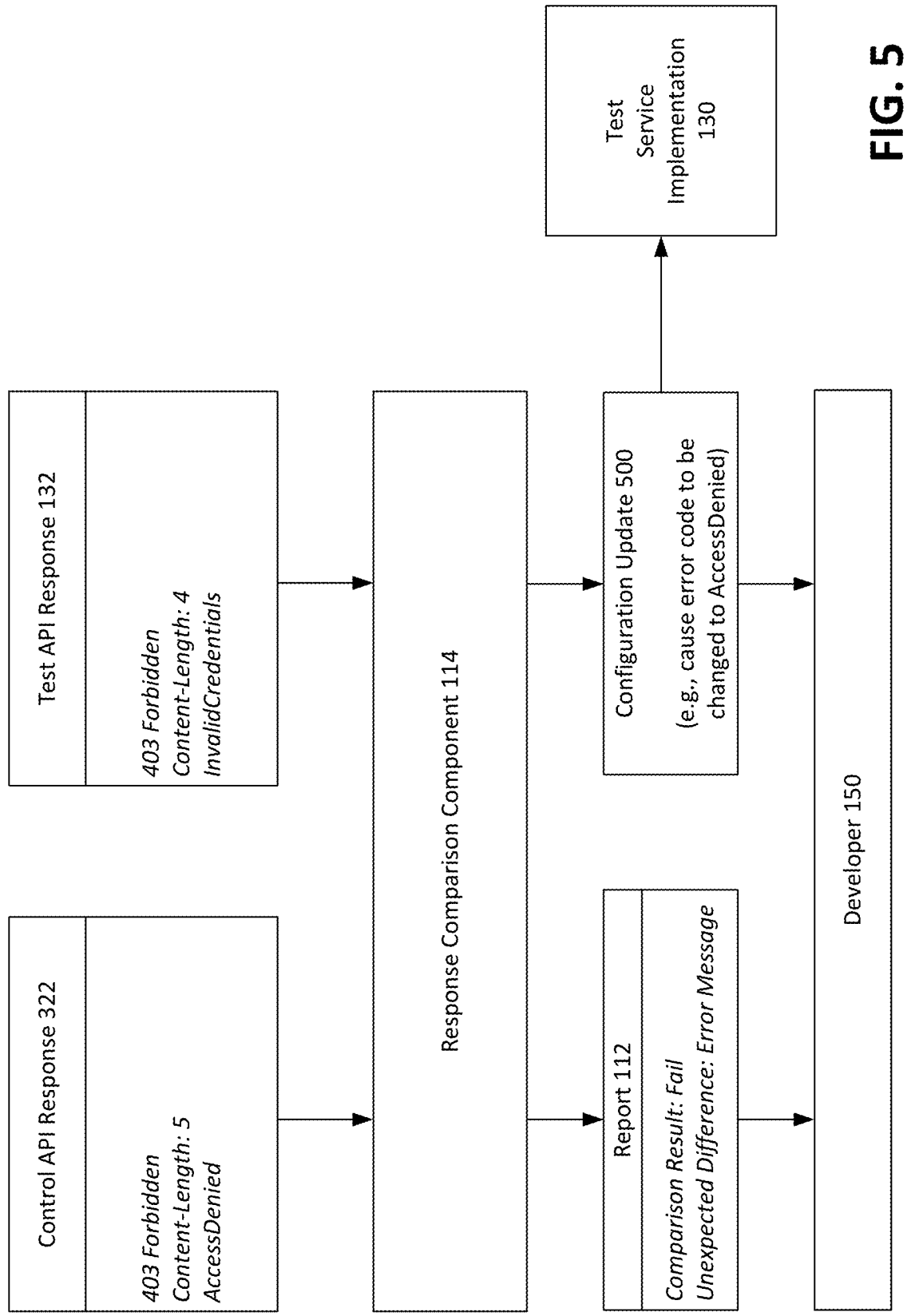
FIG. 5 is a diagram illustrating an example API response comparison with automatic correction that may be used in accordance with the present disclosure.

Referring now to FIGS. 3-5, some example API response comparisons will now be described in detail. In particular, referring to FIG. 3, an example unexpected difference is shown between a control API response 322 and test API response 132. The examples of FIGS. 3-5 may relate to either sameness testing, as described above with reference to FIG. 1, or correctness testing, as described above with reference to FIG. 2. Thus, control API response 322 may be, for example, either control API response 122 of FIG. 1 (e.g., for sameness testing) or control API response 222 of FIG. 2 (e.g., for correctness testing). As shown in FIG. 3, control API response 322 and test API response 132 are provided to response comparison component 114 of computing framework 100. The response comparison component 114 may then compare the contents of the control API response 322 to the contents of the test API response 132 to determine any differences between them. In the example of FIG. 3, the control API response 322 and the test API response 132 include a different value in their respective content length headers. Specifically, the control API response 322 indicates a content length of five, and the test API response 132 indicates a content length of four. In the example of FIG. 3, content length is not an expected difference between the control API response 322 and the test API response 132. This means that the expected difference set 111 of FIG. 1, which may be provided to the computing framework 100 by the developer 150, does not identify content length as an expected difference. Accordingly, the response comparison component 114 may determine that there is at least one unexpected difference between control API response 322 and test API response 132. Based on this determination of at least one unexpected difference, the response comparison component 114 may provide a report 112, for example to developer 150, indicating that the comparison testing (e.g., sameness testing or correctness testing) between control API response 322 and test API response 132 has failed. The report 112 may also indicated any unexpected differences between the control API response 322 and test API response 132, which in this example include a difference in content length.

Referring now to FIG. 4, an example expected difference between control API response 322 and test API response 132 will now be described. In the example of FIG. 4, the control API response 322 and the test API response 132 include a different value in their respective content length headers. Specifically, the control API response 322 indicates a content length of five, and the test API response 132 indicates a content length of four. However, in the example of FIG. 4, content length is an expected difference between the control API response 322 and the test API response 132. Specifically, in the example of FIG. 4, the expected difference set 111, which may be provided to the computing framework 100 by the developer 150, does identify content length as an expected difference. There are no other differences between the control API response 322 and the test API response 132. Accordingly, in the example of FIG. 4, because content length is an expected difference, the response comparison component 114 may determine that there are no unexpected differences between control API response 322 and test API response 132. Based on this determination of no unexpected differences, the response comparison component 114 may provide a report 112, for example to developer 150, indicating that the comparison testing (e.g., sameness testing or correctness testing) between control API response 322 and test API response 132 has passed.

Referring to FIG. 5, an example unexpected difference between control API response 322 and test API response 132 with automatic correction will now be described. As shown in FIG. 5, the control API response 322 and the test API response 132 include a different value in their respective error messages. Specifically, the control API response 322 indicates an error message of AccessDenied, and the test API response 132 indicates an error message of InvalidCredentials. In the example of FIG. 5, the error message difference is not an expected difference between the control API response 322 and the test API response 132. This means that the expected difference set 111 of FIG. 1, which may be provided to the computing framework 100 by the developer 150, does not identify the error message difference as an expected difference. Accordingly, the response comparison component 114 may determine that there is at least one unexpected difference between control API response 322 and test API response 132. Based on this determination of at least one unexpected difference, the response comparison component 114 may provide a report 112, for example to developer 150, indicating that the comparison testing (e.g., sameness testing or correctness testing) between control API response 322 and test API response 132 has failed. The report 112 may also indicate any unexpected differences between the control API response 322 and test API response 132, which in this example include the error message difference.

As also shown in FIG. 5, the response comparison component 114 may automatically generate a configuration update 500. The configuration update 500 may include a configuration change to the test service implementation 130 that corrects the unexpected difference by causing the unexpected difference to be resolved. Specifically, for future test API responses with an error similar to the error in test API response 132, the configuration update 500 may cause the error code issued by the test service implementation 130 to be the same as the error code in the control API response 322, which in this example is AccessDenied. As shown in FIG. 5, the configuration update 500 may be submitted to developer 150 for approval. If the developer 150 approves of the configuration update 500, then the configuration update 500 may be executed on the underlying configuration of the test service implementation 130.

Figure 6:
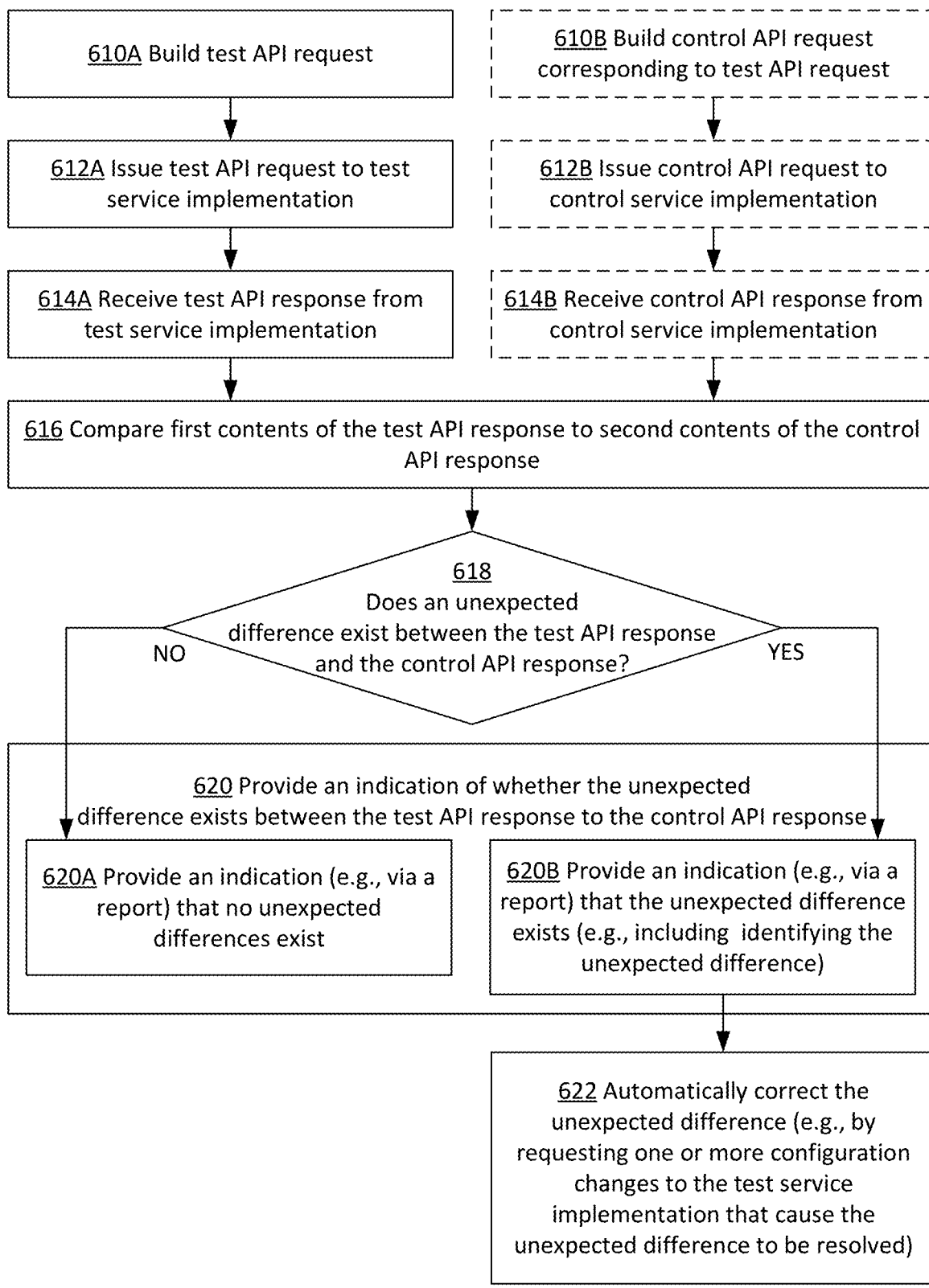
FIG. 6 is a flowchart illustrating an example API response comparison and difference correction process that may be used in accordance with the present disclosure.

FIG. 6 is a flowchart illustrating an example API response comparison and difference correction process that may be used in accordance with the present disclosure. In some examples, any, or all, of the operations shown in FIG. 6 may be performed by computing framework 100 of FIG. 1. In some examples, operations 610A-614A, which relate to the test service implementation, may be performed for both sameness testing and for correctness testing. By contrast, operations 610B-614B, which relate to the control service implementation, may be performed for sameness testing but may not be performed for correctness testing. Operations 610B-614B are shown with dashed lines to indicate that they may not be performed for correctness testing. As described above, for correctness testing, the test API response is compared to a control API response that is a known correct (e.g., pre-canned) response, and an API request need not actually be submitted to a control service implementation. As also described above, the control service implementation and the test service implementation may be implementations of computing services. In some examples, the test service implementation may be a first implementation of a service, and the control service implementation may be a second implementation of the same service. In some cases, the test service implementation may be an implemented on an edge-based computing infrastructure, and the control service implementation may be an implemented on a region-based computing infrastructure. In some examples, the test service implementation may be implemented on other types of computing infrastructures, such as local zones, single availability zones, and the like. In some examples, the computing framework 100 may be extensible to compare any two different implementations of the same service and may be reusable in a wide variety of computing infrastructures.

At operation 610A, a test API request is built. Additionally, at operation 610B (e.g., for sameness testing), a control API request is built that corresponds to the test API request. As described above with reference to FIG. 1, the computing framework 100 may include a request builder component 115 that may build the test API request 131 and the control API request 121. The test API request 131 and the control API request 121 may correspond to one another, meaning that they may request performance of the same underlying operation, albeit on different implementations. In order to build an identical, or near identical, test API request 131 and control API request 121, the request builder component 115 may employ and access a protocol library, such as an HTTP library, that allows the computing framework to directly manipulate different elements of the test API request 131 and the control API request 121, for example including the HTTP method (or other protocol method), the path, the headers, and the body.

At operation 612A, the test API request is issued to a test service implementation. For example, as described above with reference to FIG. 1, test API request 131 is issued, by the computing framework 100, to test service implementation 130. At operation 612B (e.g., for sameness testing), the control API request is issued to a control service implementation. For example, as described above with reference to FIG. 1, control API request 121 is issued, by the computing framework 100, to control service implementation 120. At operation 614A, a test API response is received from the test service implementation. The test API response is responsive to the test API request. For example, as described above with reference to FIG. 1, test API response 132, which is responsive to test API request 131, is received, by the computing framework 100, from test service implementation 130. At operation 614B (e.g., for sameness testing), the control API response is received from the control service implementation. The control API response is responsive to the control API request. For example, as described above with reference to FIG. 1, control API response 122, which is responsive to control API request 121, is received, by the computing framework 100, from control service implementation 120.

At operation 616, first contents of the test API response are compared to second contents of the control API response. The comparing of the first contents of the test API response to the second contents of the control API response may be performed based, at least in part, on a set of one or more expected differences (e.g., expected difference set 111 of FIG. 1) associated with the test API response and the control API response. One or more indications of the set of one or more expected differences may be received from one or more users. As described above, for sameness testing (e.g., as shown in FIG. 1), the test API response 132 may be compared to a control API response 122 that is received from control service implementation 120 in response to control API request 121. As also described above, the computing framework 100 may include response comparison component 114, which may compare the test API response 132 to the control API response 122. The response comparison component 114 may unpack the test API response 132 and the control API response 122, for example again using a protocol library (e.g., an HTTP library), which allows the response comparison component 114 to directly access different elements of the test API response 132 and the control API response 122.

The comparing of the first contents of the test API response to the second contents of the control API response may include comparing a test header, a test body, and/or test status code of the test API response to a control header, a control body, and/or control status code of the control API response. As described above, the response comparison component 114 may compare the different elements of the test API response 132 (e.g., status code, header, response body, etc.) to respective elements of the control API response 122 (e.g., status code, header, response body, etc.). The response comparison component 114 may then identify differences between the test API response 132 and the control API response 122. Some example differences may include a header presence mismatch (e.g., a header that exists in one response but not the other), a header value mismatch (e.g., that values of respective headers differ between the two responses), a status code mismatch (e.g., that the status codes differ between the two responses), a body type mismatch (e.g., one response body is empty, while the other is in a language such as extensible markup language (XML)), an XML node or other body node mismatch (e.g., an XML node or other body node exists in one response but not the other), and an object body mismatch (e.g., a mismatch in the actual data that is retrieved by the responses).

In some examples, the comparing of the first contents of the test API response to the second contents of the control API response may include building and traversing a test extensible markup language (XML) node tree corresponding to the test API response and building and traversing a control XML node tree corresponding to the control API response. For example, the bodies of the control API response 122 and the test API response 132 may include XML nodes. In these scenarios, one or more XML libraries, such as including an XML parsing library, may be employed to assist in comparing the body of the control API response 122 to the body of the test API response 132. For example, the response comparison component 114 may employ the one or more XML libraries to assist in building a control XML node tree that corresponds to the control API response 122 and to assist in building a test XML node tree that corresponds to the test API response 132. The response comparison component 114 may also employ the one or more XML libraries to assist in traversing the control XML node tree and the test XML node tree. For example, the one or more XML libraries may assist in performing node-by-node comparisons between the control XML node tree and the test XML node tree, such as in which each node of the control XML node tree is compared to a respective node of the test XML node tree. In some examples, the one or more XML libraries may define hooks that allow logic of the computing framework to be hooked into the one or more XML libraries, such as for determination of whether a detected difference is an expected difference or an unexpected difference.

For correctness testing (e.g., as shown in FIG. 2), the test API response 132 may be compared to a control API response 222 that is a known correct (e.g., pre-canned) response. The control API response 222 may be defined in code. Thus, the correctness testing may remove the need to create and issue a control API request 121 to a control service implementation 120, such as in scenarios when it may be difficult to access the control service implementation 120. The correctness testing may evaluate differences between the test API response 132 and the control API response 222 in the same manner as the sameness testing described above.

At operation 618, it may be determined, based on the comparing of operation 616, whether an unexpected difference exists between the test API response and the control API response. The unexpected difference is a difference that is not included in the set of one or more expected differences. For example, for each detected difference between the test API response 132 and the control API response 122, the response comparison component 114 may consult the expected difference set 111 to determine whether the detected difference is an expected difference (meaning that the detected difference is included in the expected difference set 111) or an unexpected difference (meaning that the detected difference is not included in the expected difference set 111). For example, if at least one of the detected differences is not indicated in expected difference set 111, then there is an unexpected difference between the test API response 132 and the control API response 122.

At operation 620, an indication is provided of whether the unexpected difference exists between the test API response and the control API response. The indication of whether the unexpected difference exists between the test API response and the control API response may be provided to enable a determination related to performance of a corrective action. For example, in some cases, if no unexpected differences exist, then a determination may be made that a corrective action is unnecessary. By contrast, if an unexpected difference exists, then a determination may be made to perform a corrective action, such as by making configuration changes to the test service implementation 130 to resolve the unexpected difference or by otherwise resolving the unexpected difference. The providing of the indication of whether the unexpected difference exists may include identifying the expected difference. Operation 620 may include either sub-operation 620A or sub-operation 620B. For example, if, at operation 618, it is determined that no unexpected differences exist between the test API response and the control API response, then, at sub-operation 620A, an indication may be provided (e.g., via a report) that no unexpected differences exist between the test API response and the control API response. By contrast, if, at operation 618, it is determined that the unexpected difference exists between the test API response and the control API response, then, at sub-operation 620B, an indication may be provided (e.g., via a report) that the unexpected difference exists between the test API response and the control API response, for example including identifying the unexpected difference. As described above, the computing framework 100 may provide a report 112 to the developer 150 regarding the response comparison. In some examples, the report 112 may indicate whether at least one unexpected difference was detected between the test API response 132 and the control API response 122. For example, in some cases, the report 112 may include a pass/fail result. Specifically, a pass designation may indicate that no unexpected differences were detected between the test API response 132 and the control API response 122, while a failure designation may indicate that at least one expected difference was detected between the test API response 132 and the control API response 122. Additionally, for scenarios in which at least one unexpected difference is detected between the test API response 132 and the control API response 122, the report 112 may identify each of the unexpected differences.

At operation 622, the unexpected difference may be automatically corrected, such as by requesting one or more configuration changes to the test service implementation that cause the unexpected difference to be resolved. As described above with reference to FIG. 1, the computing framework 100 may include auto-correction component 113, which may optionally automatically correct unexpected differences between the test API response 132 and the control API response 122, such as by requesting configuration changes to the test service implementation 130 that cause the unexpected differences to be resolved. Specifically, in some examples, the auto-correction component 113 may correct differences, such as mismatches in status codes and error messages. The developer 150 can use this tool early on in the development process to quickly detect and correct any differences with the control service implementation 120. In some examples, auto-correction component 113 may trigger an update request to the configuration of the test service implementation 130 and submit it for developer approval. Thus, the automatic correction may include automatically generating an update request, submitting the update request for approval (if necessary), and issuing the update request (subject to approval if necessary). In some examples, in order to assist in enabling automatic updates, developer 150 may provide update information to the computing framework 100. This update information may include, for example, indications of a service endpoint to which to issue configuration updates, indications of formats for building a change request, and indications of interpretations of configuration data that exists within the test service implementation 130.

It is noted that, while the above examples relate to scenarios in which there are expected differences between API responses from the test service implementation and the control service implementation, it is not required that there must always be expected differences between these implementations. For example, in some cases, there may be no expected differences, and the computing framework 100 may be configured to detect and report all differences between the test API response and the control API response. Moreover, in some cases, even if there are expected differences, the computing framework may nevertheless be configured to detect and report all differences, regardless of whether they are expected or unexpected. In this scenario, the report 112 may identify all detected differences and may optionally indicate whether each detected difference is expected or unexpected. Thus, in some examples, the techniques described herein may include comparing first contents of the test API response to second contents of a control API response; determining, based on the comparing, whether a difference exists between the test API response and the control API response; and providing an indication of whether the difference exists between the test API response and the control API response. Also, in some examples, the techniques described herein may include comparing first contents of the test API response to second contents of a control API response; determining, based on the comparing, that a difference exists between the test API response and the control API response; providing one or more indications that the difference exists between the test API response and the control API response, for example by identifying the difference; and correcting the difference by requesting one or more configuration changes to the test service implementation that cause the difference to be resolved.

Figure 7:
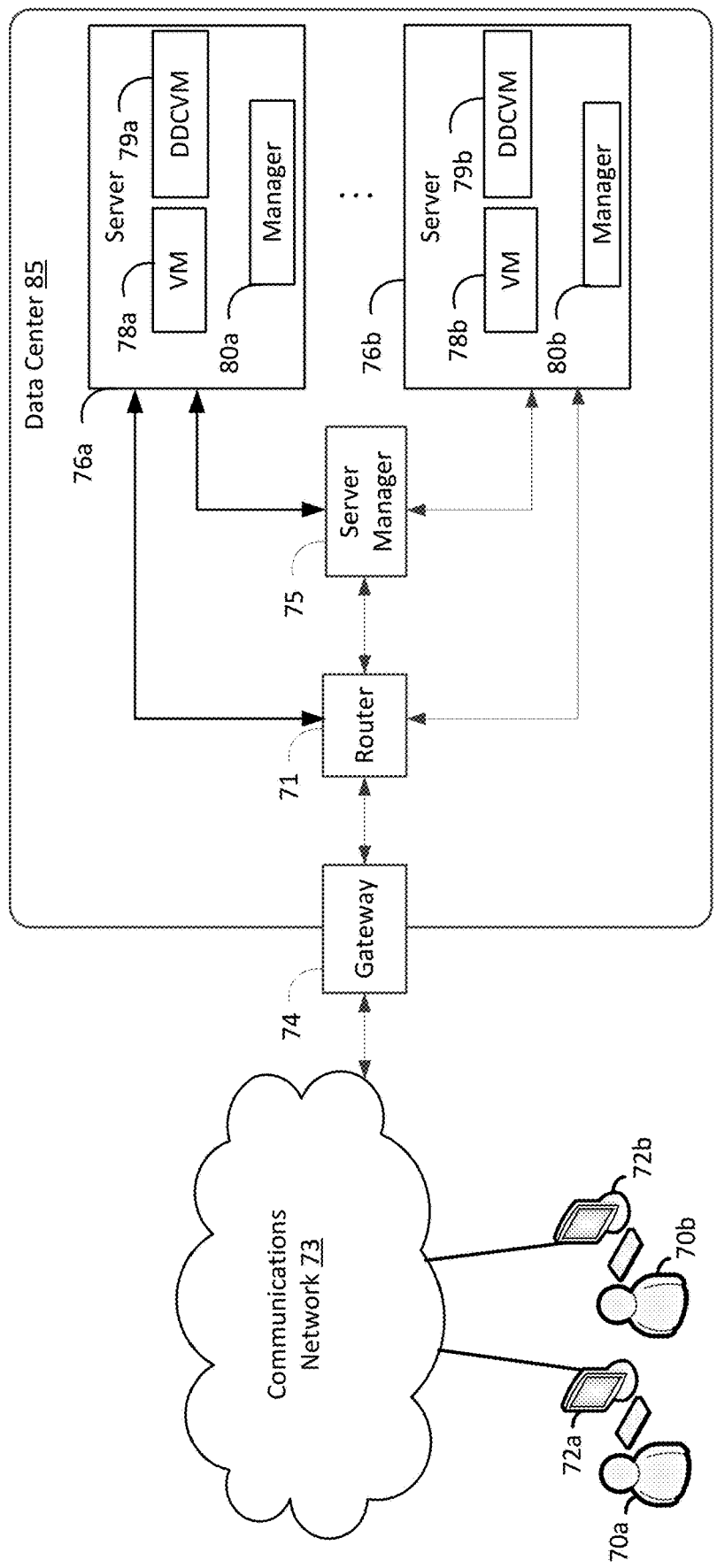
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include difference detection and correction virtual machines (DDCVM's) 79a-b, which are virtual machines that are configured to execute any, or all, of the test and control API response comparison, difference detection, and correction techniques and other techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
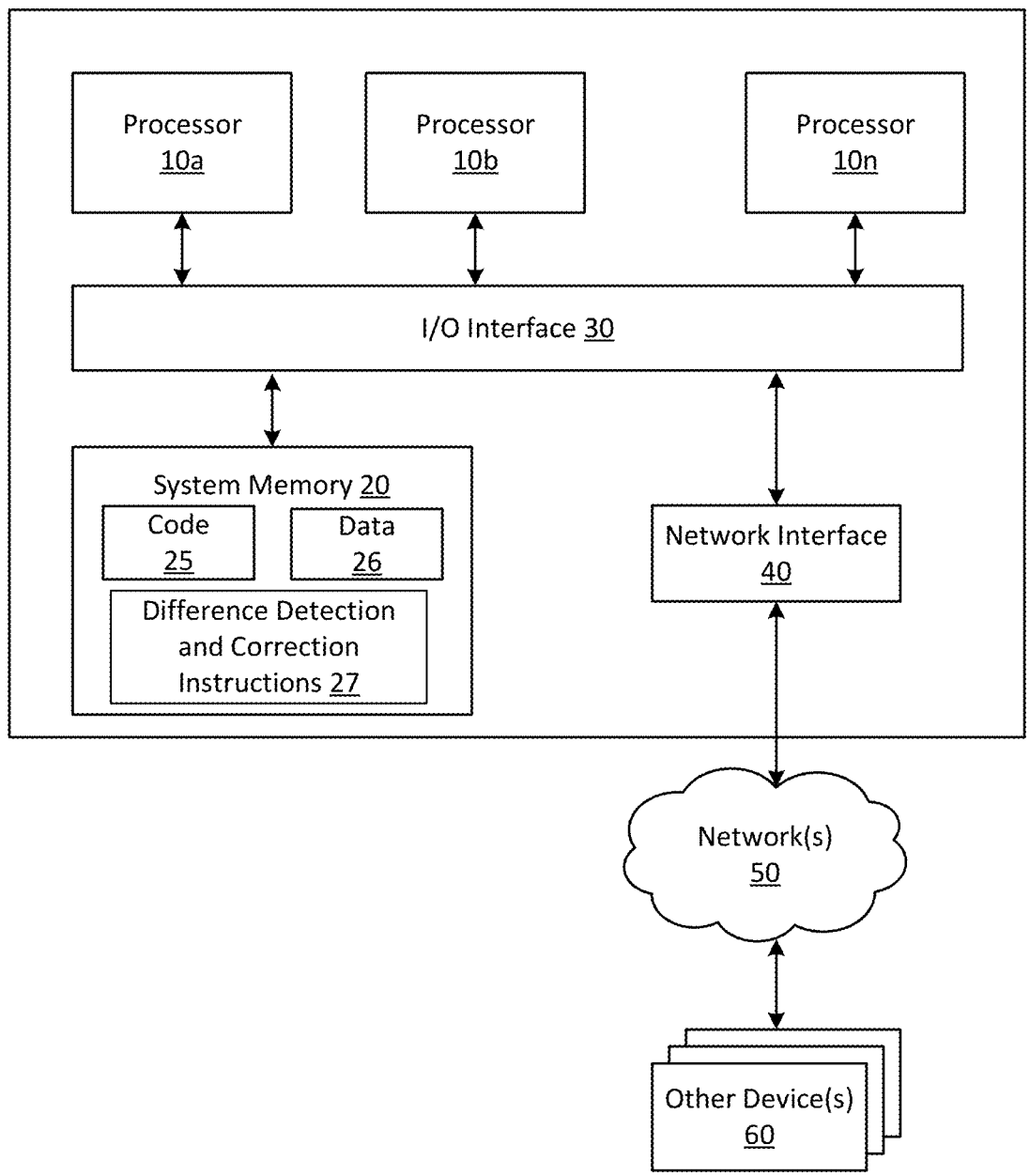
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash©-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes difference detection and correction instructions 27, which are instructions for executing any, or all, of the test and control API response comparison, difference detection, and correction techniques and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform computing operations comprising:
      issuing, to a test service implementation, a test application programming interface (API) request, wherein the test service implementation is implemented on an edge-based computing services infrastructure;
      receiving, from the test service implementation, a test API response that is responsive to the test API request;
      issuing, to a control service implementation, a control API request that corresponds to the test API request, wherein the control service implementation is implemented on a region-based computing services infrastructure;
receiving, from the control service implementation, a control API response, wherein the control API response is responsive to the control API request;
comparing first contents of the test API response to second contents of the control API response, wherein the comparing is performed based at least in part on a set of one or more expected differences associated with the test API response and the control API response;
determining, based on the comparing, that an unexpected difference exists between the test API response and the control API response that is not included in the set of one or more expected differences;
providing a first indication that the unexpected difference exists between the test API response and the control API response; and
automatically correcting the unexpected difference by requesting one or more configuration changes to the test service implementation that cause the unexpected difference to be resolved.

2. The computing system of claim 1, wherein the operations further comprise:
receiving, from one or more users, one or more second indications of the set of one or more expected differences.

3. The computing system of claim 1, wherein the comparing the first contents of the test API response to the second contents of the control API response comprises comparing a test header, a test body, and test status code of the test API response to a control header, a control body, and control status code of the control API response.

4. The computing system of claim 1, wherein the providing of the first indication that the unexpected difference exists comprises identifying the unexpected difference.

5. A computer-implemented method comprising:
issuing, to a test service implementation, a test application programming interface (API) request;
receiving, from the test service implementation, a test API response that is responsive to the test API request;
comparing first contents of the test API response to second contents of a control API response, wherein the comparing is performed based at least in part on a set of one or more expected differences associated with the test API response and the control API response;
determining, based on the comparing, whether an unexpected difference exists between the test API response and the control API response that is not included in the set of one or more expected differences; and
providing a first indication of whether the unexpected difference exists between the test API response and the control API response to enable a determination related to performance of a corrective action.

6. The computer-implemented method of claim 5, wherein the test service implementation is implemented on an edge-based computing services infrastructure.

7. The computer-implemented method of claim 5, further comprising:
issuing, to a control service implementation, a control API request that corresponds to the test API request; and
receiving, from the control service implementation, the control API response, wherein the control API response is responsive to the control API request.

8. The computer-implemented method of claim 7, wherein the control service implementation is implemented on a region-based computing services infrastructure.

9. The computer-implemented method of claim 5, further comprising:
automatically correcting the unexpected difference by requesting one or more configuration changes to the test service implementation that cause the unexpected difference to be resolved.

10. The computer-implemented method of claim 5, further comprising:
receiving, from one or more users, one or more second indications of the set of one or more expected differences.

11. The computer-implemented method of claim 5, wherein the providing of the first indication of whether the unexpected difference exists comprises identifying the unexpected difference.

12. The computer-implemented method of claim 5, wherein the comparing the first contents of the test API response to the second contents of the control API response comprises comparing a test header, a test body, and test status code of the test API response to a control header, a control body, and control status code of the control API response.

13. The computer-implemented method of claim 5, wherein the comparing of the first contents of the test API response to the second contents of the control API response comprises building and traversing a test extensible markup language (XML) node tree corresponding to the test API response and building and traversing a control XML node tree corresponding to the control API response.

14. One or more non-transitory computer-readable storage media having stored thereon computing instructions that, upon execution by one or more computing devices, cause the one or more computing devices to perform computing operations comprising:
issuing, to a test service implementation, a test application programming interface (API) request;
receiving, from the test service implementation, a test API response that is responsive to the test API request;
comparing first contents of the test API response to second contents of a control API response, wherein the comparing is performed based at least in part on a set of one or more expected differences associated with the test API response and the control API response;
determining, based on the comparing, whether an unexpected difference exists between the test API response and the control API response that is not included in the set of one or more expected differences; and
providing a first indication of whether the unexpected difference exists between the test API response and the control API response to enable a determination related to performance of a corrective action.

15. The one or more non-transitory computer-readable storage media of claim 14, wherein the test service implementation is implemented on an edge-based computing services infrastructure.

16. The one or more non-transitory computer-readable storage media of claim 14, wherein the operations further comprise:
issuing, to a control service implementation, a control API request that corresponds to the test API request; and
receiving, from the control service implementation, the control API response, wherein the control API response is responsive to the control API request.

17. The one or more non-transitory computer-readable storage media of claim 16, wherein the control service implementation is implemented on a region-based computing services infrastructure.

18. The one or more non-transitory computer-readable storage media of claim 14, wherein the operations further comprise:
   automatically correcting the unexpected difference by requesting one or more configuration changes to the test service implementation that cause the unexpected difference to be resolved.

19. The one or more non-transitory computer-readable storage media of claim 14, wherein the operations further comprise:
   receiving, from one or more users, one or more second indications of the set of one or more expected differences.

20. The one or more non-transitory computer-readable storage media of claim 14, wherein the providing of the first indication of whether the unexpected difference exists comprises identifying the unexpected difference.

* * * * *